United States Patent
Yu

(10) Patent No.: US 7,379,747 B2
(45) Date of Patent: May 27, 2008

(54) METHOD FOR CONTROLLING OUTPUT POWER OF HANDHELD TERMINAL IN MOBILE COMMUNICATION SYSTEM

(75) Inventor: Jae-Wook Yu, Anyang (KR)

(73) Assignee: LG Electronics Inc., Seoul (KR)

( * ) Notice: Subject to any disclaimer, the term of this patent is extended or adjusted under 35 U.S.C. 154(b) by 538 days.

(21) Appl. No.: 10/740,629

(22) Filed: Dec. 22, 2003

(65) Prior Publication Data

US 2004/0132478 A1 Jul. 8, 2004

(30) Foreign Application Priority Data

Dec. 20, 2002 (KR) ...................... 10-2002-0081867

(51) Int. Cl.
*H04Q 7/20* (2006.01)
(52) U.S. Cl. .................... 455/522; 455/115.3
(58) Field of Classification Search .................. 455/69, 455/522, 423, 440, 441, 42, 456.1, 504–506, 455/126, 127.1, 127.2, 115.3; 370/320, 321
See application file for complete search history.

(56) References Cited

U.S. PATENT DOCUMENTS

| | | | | |
|---|---|---|---|---|
| 5,574,993 A | * | 11/1996 | Kobayashi et al. | ......... 455/126 |
| 6,081,727 A | * | 6/2000 | Kondo | ........................ 455/522 |
| 6,085,108 A | | 7/2000 | Knutsson et al. | |
| 6,952,181 B2 | * | 10/2005 | Karr et al. | ................... 342/457 |
| 2002/0019245 A1 | | 2/2002 | Longoni et al. | |

FOREIGN PATENT DOCUMENTS

| | | |
|---|---|---|
| CN | 1294469 A | 5/2001 |
| WO | WO 02/23764 A2 | 3/2002 |

* cited by examiner

*Primary Examiner*—Tu Nguyen
(74) *Attorney, Agent, or Firm*—Birch, Stewart, Kolasch & Birch, LLP

(57) ABSTRACT

A method for controlling an output power of a plurality of handheld terminals in a mobile communication system, includes: generating a TPC coding value according to transmit output characteristics of each handheld terminal; setting an uplink Eb/No reference value with respect to each handheld terminal and comparing the Eb/No reference value with the respective TPC coding value; selecting an optimum power control command value and transmitting the selected power control command value to the handheld terminal; and adjusting a transmit power level of the handheld terminal based on the TPC coding value and the selected power control command value.

18 Claims, 3 Drawing Sheets

New Coding example of TPC for QPSK

| TPC | TPC Bits | Meaning |
|---|---|---|
| 'Up' PA | 11 | PA output increase |
| 'Up' Mixer | 10 | Mixer output increase |
| 'Down' PA | 01 | PA output decrease |
| 'Down' Mixer | 00 | Mixer output decrease |

Coding of TPC for QPSK (Length of TPC = 1symbol)

| TPC | TPC Bits | Meaning |
|---|---|---|
| 'Up' | 11 | Tx Power increase |
| 'Down' | 00 | Tx Power decrease |

Coding of TPC for 8PSK (Length of TPC = 1symbol)

| TPC | TPC Bits | Meaning |
|---|---|---|
| 'Up' | 111 | Tx Power increase |
| 'Down' | 001 | Tx Power decrease |

New Coding example of TPC for QPSK

| TPC | TPC Bits | Meaning |
|---|---|---|
| 'Up' PA | 11 | PA output increase |
| 'Up' Mixer | 10 | Mixer output increase |
| 'Down' PA | 01 | PA output decrease |
| 'Down' Mixer | 00 | Mixer output decrease |

METHOD FOR CONTROLLING OUTPUT POWER OF HANDHELD TERMINAL IN MOBILE COMMUNICATION SYSTEM

This Nonprovisional application claims priority under 35U.S.C. § 119(a) on Patent Application No(s) 2002-0081867 filed in Korea on Dec. 20, 2002, the entire contents of which are hereby incorporated by reference.

BACKGROUND OF THE INVENTION

1. Field of the Invention

The present invention is directed to a method for controlling the output power of a handheld terminal in a mobile communication system and, more particularly, to a method for controlling the output power of a handheld terminal capable of controlling uplink output power of a handheld terminal in an optimum state.

2. Description of the Background Art

In a mobile communication system, a registered handheld terminal can perform communication by being connected with the other party wirelessly through a base station (BS). One of the methods for making a plurality of handheld terminals communicate simultaneously by using limited frequency or channel resources is known as the time division synchronous code division multiple access (TD-SCDMA) method.

The TD-SCDMA method performs time division of a signal by code division multiple access (CDMA) and is adopted for standard mobile communication system in China.

In a mobile communication system using the TD-SCDMA method, communications are transmitted with the same frequency spectrum from a plurality of handheld terminals in the same geographic area. The transmitted signals are coded according to a unique assigned code. Because they may interfere with each other, signals transmitted from the handheld terminals to the BS in a pertinent service area must have a similar signal intensity. Accordingly, to control the interference level, one of the basic principles in the TD-SCDMA method is that the output power of each of the handheld terminals has to be controlled.

In order to control the output power in the TD-SCDMA method, a closed-loop power control method is used, in which an increase or decrease in the intensity of a signal transmitted from a handheld terminal is commanded based on the intensity of a signal received at the handheld terminal from the BS.

In the china wireless telecommunication standards group (CWTS), for example, a position of a transmit power control (TPC) code that is capable of commanding an intensity increase/decrease of a transmitted signal can be obtained in a time slot burst structure of a physical channel structure.

Hereinafter, a conventional method for controlling the output power of a handheld terminal in a mobile communication system will be described with reference to FIGS. 1 and 2.

FIG. 1 illustrates a structure of a physical channel in accordance with the background art.

As depicted in FIG. 1, in a digital mobile communication system using the TD-SCDMA method, a signal is transmitted by frames. Each frame is a radio frame, which has a time cycle of 10 ms, for example. One frame consists of two sub-frames, each having 6,400 chips and a 5ms cycle, and is thus transmitted at 1.28 MChips/s. Herein, each sub-frame consists of a total of seven time slots from TS0 to TS7. Furthermore, a time slot is used for uplink or downlink communication based on the transmitted data.

Each time slot is 0.675 ms and consists of 864 chips. As shown in FIG. 1, each time slot is constructed in the following order: a data symbol, a first transport format combination indicator (TFCI), a midamble, a synchronization shift (SS) symbol, a TPC symbol, a second TFCI, a data symbol and a guard period (GP).

In this construction, the first and second TFCIs indicate transport formats and data fields. The midamble is a chip sequence which is used by the BS in the uplink or a mobile terminal in the downlink for channel estimation for the retrieval of a user's signals. The GP is inserted at the end of each time slot. The TPC symbol (hereinafter referred to as a TPC) is used for an output power control command, and it is indicated by deviant lines in FIG. 1.

FIG. 2 is a state diagram illustrating an output power control code state of a digital mobile communication system by the TD-SCDMA method in accordance with the background art.

In the TSC103 standard of the CWTS, whether quadrature phase shift keying (QPSK) or 8 phase shift keying (8PSK) is used, the TPC typically performs two commands, such as on the uplink and downlink communications, by being compared with a reference value. More specifically, in order to command an intensity increase/decrease of the transmitted signal, one symbol is allocated to the TPC, two bits are allocated in the QPSK method as a modulation method for a digital signal, and three bits are allocated in the 8PSK method.

However, the TPC uses only two commands for increasing and decreasing output power by using two statuses respectively. In addition, in the conventional terminal transmit path using the above-mentioned system, a physical automatic power control (APC) signal capable of changing only the power in a mixer unit is mainly used. Accordingly, with the above-mentioned output power control method, it is difficult to minimize power consumption or obtain the optimum uplink signal quality in various communication environments.

SUMMARY OF THE INVENTION

Accordingly, the present invention is directed to a method for controlling output power of a handheld terminal in a mobile communication system which substantially obviates one or more problems due to the limitations and disadvantages of the background art.

In order to solve the above-mentioned problems, it is an object of the present invention to provide a method for controlling output power of a handheld terminal in a mobile communication system capable of minimizing power consumption and controlling uplink output quality of a handheld terminal in an optimum state by controlling an amplification rate by generating various TPC coding values.

In order to achieve the above-mentioned object, a method for controlling an output power of a plurality of handheld terminals in a mobile communication system includes generating a TPC coding value according to transmit output characteristics of each handheld terminal; setting an uplink Eb/No reference value with respect to each handheld terminal and comparing the Eb/No reference value with the respective TPC coding value; selecting an optimum power control command value and transmitting the selected power control command value to the handheld terminal; and adjusting a transmit power level of the handheld terminal based on the TPC coding value and the selected power control command value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. The preferred embodiment of a method for controlling output power of a handheld terminal in a mobile communication system capable of minimizing power consumption and controlling uplink output quality of a handheld terminal as the optimum state by controlling an amplification rate by generating each TPC coding value according to handheld terminal transmission power characteristics will be described with reference to FIGS. 3 to 5.

Figure 1:
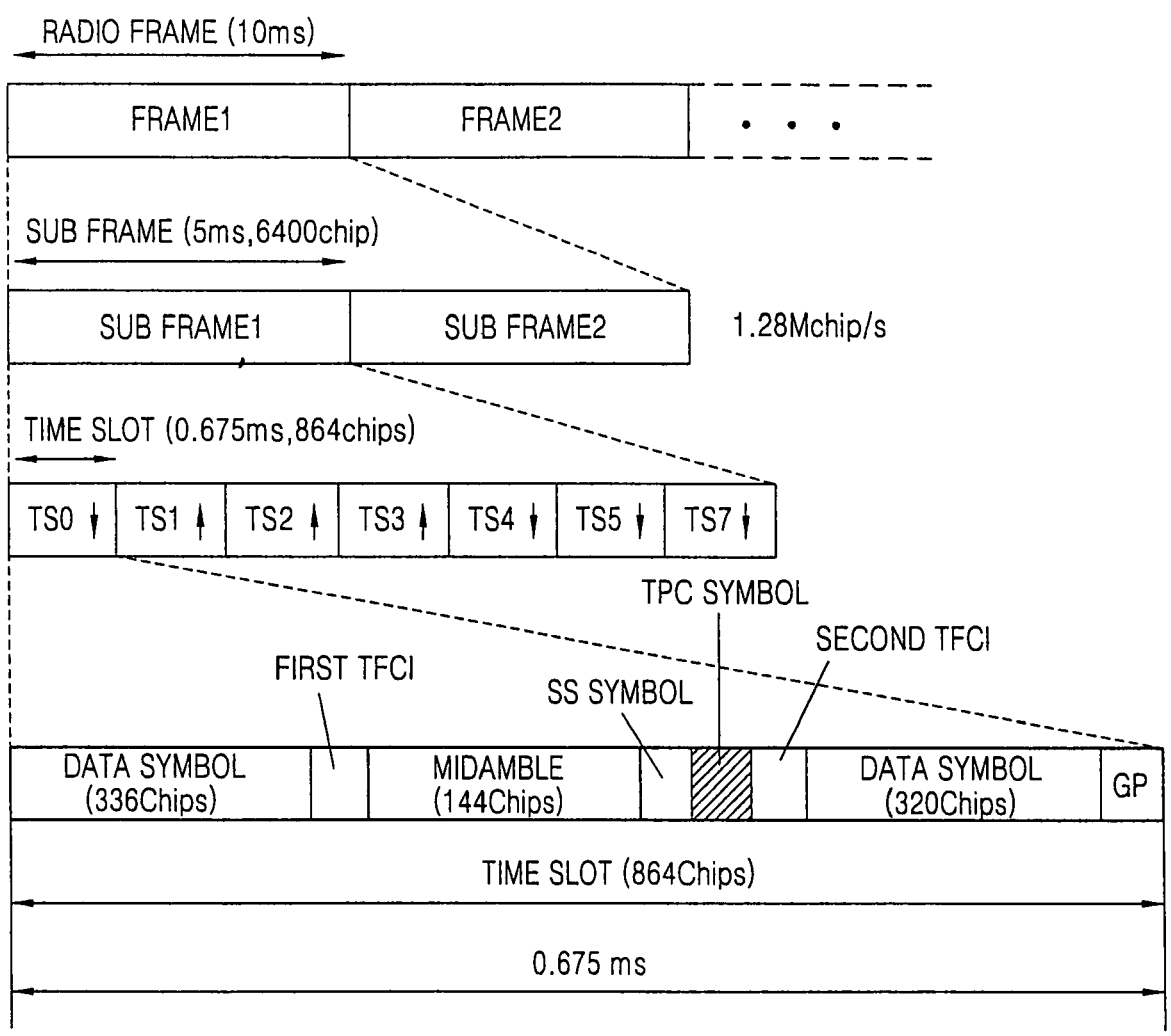
FIG. 1 illustrates a structure of a physical channel in accordance with the background art.
Figures 2, 3:
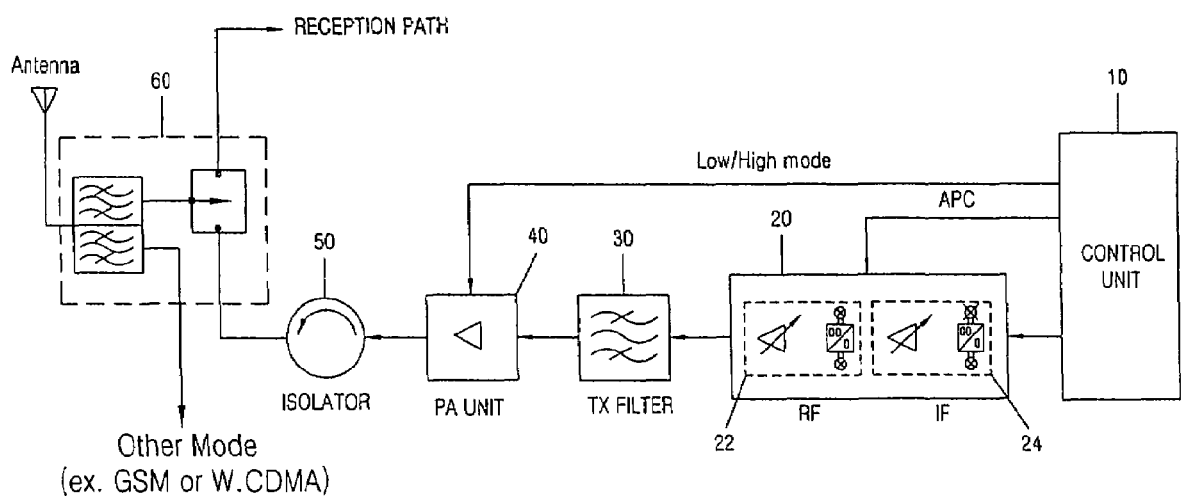
FIG. 2 is a table illustrating a state of an output power control code of a digital mobile communication system by a TD-SCDMA method in accordance with the background art.
FIG. 3 is an exemplary view illustrating a construction of a transmission path of a TD-SCDMA handheld terminal in accordance with the present invention.

FIG. 3 is an exemplary view illustrating a construction of a transmission path of a TD-SCDMA handheld terminal in accordance with the present invention.

As depicted in FIG. 3, the TD-SCDMA handheld terminal includes a control unit 10 for processing and outputting a base-band signal, controlling each of the handheld terminals and controlling an amplification rate of each amplifying unit according to a TPC signal. A mixer unit 20 modulates the base-band signal applied from the control unit 10 into an intermediate frequency (IF) signal. A transmit IF mixer unit 24 amplifies the modulated IF signal at an amplification rate set by an APC signal applied from the control unit 10. The IF signal is modulated into an RF signal by a transmit RF mixer unit 22. The modulated RF signal is amplified at an amplification rate set by an APC signal applied from the control unit 10 and is outputted. A transmit (TX) filter 30 removes noise components applied from the mixer unit 20 and outputting a RF signal. A power amplifier (PA) unit 40 amplifies the RF signal applied from the TX filter 30 at an amplification rate set by the control unit 10. An isolator 50 transmits a signal from the PA unit 40 in a certain direction so as not to be applied in a reverse direction. A switch duplexer 60 transmits the signal applied from the isolator 50 wirelessly and also divides a signal received through an antenna.

The method for controlling the output power of a handheld terminal in the mobile communication system in accordance with the present invention will be described in more detail.

First, when different variable amplifiers having several phases are used, although the gain is the same from the input to the output, the final output characteristics are completely different depending on the variable weighting allocation given to a variable amplifier of each phase.

In a first example, the gain of mixer unit 20 may be 10 dB and the gain of the PA unit 40 may be 40 dB. In a second example, the gain of the mixer unit 20 may be 40 dB and the gain of the PA unit 40 may be 10 dB. Although the total gain of a transmit path, the mixer unit 20 and the PA unit 40 is 50 dB, in this example, the RF characteristics in an output block of the handheld terminal are completely different in the two cases. More specifically, although the same output gain occurs, when the amplification is allocated at a high rate to the mixer unit 20, the consumed current amount is reduced. When the amplification is allocated at a high rate to the PA unit 40 for increasing the final output power, the consumed current amount is increased.

At the output block of the handheld terminal, the handheld terminal transmit characteristics such as an adjacent channel leakage power ratio (ACLR) and intermodulation, etc., are different, and accordingly uplink reception characteristics values, such as the bit energy per noise density, Eb/No, defined as the ratio of signal energy per information-bit to noise power spectral density, etc., measured in a base station are different. Accordingly, the base station can select a better uplink signal quality.

In addition, the handheld terminal may include a plurality of amplifiers. In the handheld terminal, there is a first APC amplifier used for IF modulation, a second APC amplifier used for RF modulation, and a PA used for amplifying the final output power as a high output. Herein, a variable of the PA can be different according to the specifications of manufacturers. However, because the PA generally includes a function for selecting the bias voltage and modes (high gain/low gain), the handheld terminal can add a variable of the PA to an APC signal.

In addition, when 8PSK is used for the modulation method, because there are three TPC bits, it is possible to increase the number of TPC bits to twice that of the number of bits in the method of the background art. For example, in the TSC103 standard of the CWTS using the TD-SCDMA method, since two bits are allocated for TPC in the QPSK method, the TPC coding method in accordance with the present invention is constructed so as to be adapted to four status communication environment in the QPSK method. Moreover, since three bits are allocated for TPC in the 8PSK method, the TPC coding method in accordance with the present invention is constructed so as to be adapted to eight status communication environment in the 8PSK method.

Figures 4, 5:
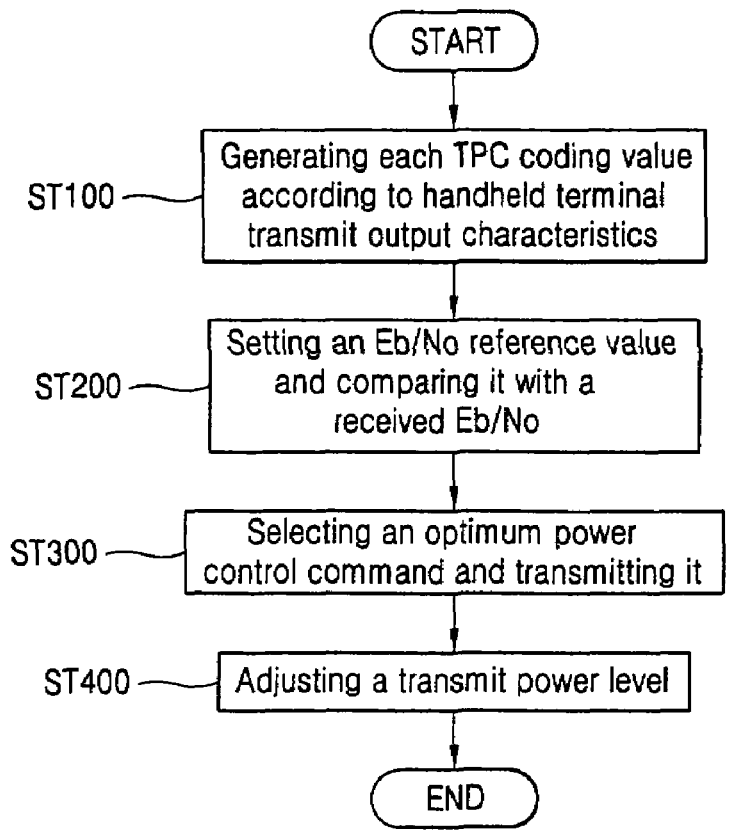
FIG. 4 is a table illustrating a TPC coding of a QPSK modulation method in accordance with the present invention.
FIG. 5 is a flow chart illustrating a method for controlling output power of a handheld terminal in a mobile communication system in accordance with the present invention.

FIG. 4 is a table illustrating a TPC coding of a QPSK modulation method in accordance with the present invention.

As depicted in FIG. 4, in the conventional QPSK modulation method, it is possible to select an uplink quality signal according to TPC coding only in a simple case such as uplink and downlink communication. However, in the TPC coding in accordance with the present invention, even in uplink communication, a determination is made as to which part is to be operational in order to obtain a better uplink signal quality and power consumption.

FIG. 5 is a flow chart illustrating a method for controlling the output power of a handheld terminal in a mobile communication system in accordance with the present invention.

As depicted in FIG. 5, when the output power of the handheld terminal is controlled by the base station, in order to control a transmit power level at the optimum state, the control unit 10 of the handheld terminal generates various TPC coding values corresponding to an APC of the mixer unit 20 and a high/low mode amplification rate control signal of the PA unit 40, and outputs them to the base station, as shown at step ST100.

The base station sets an uplink Eb/No reference value for all handheld terminals and compares the Eb/No reference value with each generated TPC coding value, as shown at step ST200. Herein, in order to select an optimum signal quality about various communication environments, the base station periodically compares an amplification rate allocation of the mixer unit 20 and the PA unit 40 according to a temporal variation by considering a distance between the base station and a handheld terminal, the weather and the speed variation due to the transfer of the handheld terminal. For example, when a distance between the base station and the handheld terminal is too far or too close, it is determined whether the Eb/No reference value is higher or lower than a certain reference level set in the base station. Then, an optimum power control command of the TPC coding value is selected and is transmitted to the handheld terminal. In addition, when a distance between the handheld terminal and the base station is increased, the output of the handheld terminal has to be increased by a control signal. Accordingly, when the output increase unit step is a 1 dB step and an output increase of +3 dB is required, the following four cases of power amplification allocation of the mixer unit 20 and the PA unit 40 occur:

3 dB of output increase in the PA unit 40 and 0 dB of output increase in the mixer unit 20;

2 dB of output increase in the PA unit 40 and 1 dB of output increase in the mixer unit 20;

1 dB of output increase in the PA unit 40 and 2 dB of output increase in the mixer unit 20;

0 dB of output increase in the PA unit 40 and 3 dB of output increase in the mixer unit 20.

When the output increase unit step is 0.5 dB step, there can be seven cases. In addition, when the weather changes abruptly or the handheld terminal is moved, the communication speed is varied because of those variations.

Afterward, the base station selects an optimum power control command of each outputted TPC coding value and transmits the selected value to the handheld terminal periodically, as shown at step ST300. By performing the above-mentioned four cases, the base station determines the best signal quality case of a received signal and notifies the handheld terminal of it.

Finally, the handheld terminal adjusts the transmit power level of the handheld terminal based on the TPC coding about the power control command value selected by the base station, as shown at step ST400.

As described-above, in the TD-SCDMA type mobile communication system, the method for controlling the output power of the handheld terminal in accordance with the present invention can use TPC coding bits to perform various power controls according to different modulation methods and generate various handheld terminal transmit output characteristics by applying an additional PA variable to an APC signal. Accordingly, it is possible to minimize current consumption while being adapted to various communication environments and control uplink output power of the handheld terminal as the optimum state.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for controlling an output power of a plurality of handheld terminals in a mobile communication system, comprising:

generating a TPC (Transmit Power Control) coding value according to transmit output characteristics of each handheld terminal;

setting an uplink Eb/No reference value with respect to each handheld terminal and comparing the Eb/No reference value with the respective TPC coding value;

selecting an optimum power control command value and transmitting the selected power control command value to the handheld terminal; and adjusting a transmit power level of the handheld terminal based on the TPC coding value and the selected power control command value, wherein the handheld terminal controls the output power by setting an amplification rate of a PA (Power Amplifier) unit and an amplification rate of a mixer unit in order to generate various transmit output characteristics based on the TPC coding value and the optimum power control command sent from the base station such that the base station selectively controls the amplification rates of the PA unit and the mixer unit, and wherein the TPC coding value and the selected power control command value sent from the base station include at least four states including 1) an increase in the amplification rate of the PA unit, 2) an increase in the amplification rate of the mixer unit, 3) a decrease in the amplification rate of the PA unit, and 4) a decrease in the amplification rate of the mixer unit.

2. The method of claim 1, wherein the handheld terminal adds a variable of the PA unit to an APC (Automatic Power Control) signal in order to generate various transmit output characteristics of the handheld terminal in the TPC coding value generating step.

3. The method of claim 2, wherein the variable of the PA unit is a bias voltage and a mode selection value.

4. The method of claim 2, wherein the handheld terminal controls the variable of the PA unit in order to generate various transmit output characteristics of the handheld terminal in the TPC coding value generating step.

5. The method of claim 4, wherein the variable of the PA unit is a bias voltage and a mode selection value.

6. The method of claim 1, wherein the handheld terminal is controlled by a modulation method in order to generate various transmit output characteristics.

7. The method of claim 6, wherein the modulation method uses two bits in a QPSK method.

8. The method of claim 6, wherein the modulation method uses three bits in an 8PSK method.

9. The method of claim 2, wherein the handheld terminal uses all TPC coding bits according to a modulation method or generates the TPC coding value by setting a variable of the PA unit in order to generate various transmit output characteristics.

10. The method of claim 1, wherein a time slot in a radio frame outputs the TPC coding value in the TPC coding value generating step.

11. The method of claim 1, wherein a radio signal transmitted by a TD-SCDMA method is used as the reference value in the reference value comparing step.

12. The method of claim 1, wherein the Eb/No value is periodically compared to a reference value in response to a temporal variation based on a distance between a base station and a handheld terminal, weather and speed variation due to transfer of a handheld terminal.

13. The method of claim 1, wherein the optimum power control command is selected by determining whether a transmit power level of a corresponding handheld terminal is higher or lower than a reference level set in a base station when a distance between the base station and the corresponding handheld terminal is too far or too close.

14. The method of claim 13, wherein an amplification rate allocation to the mixer unit and the PA unit is increased by applying one of four cases when there is +3 dB of output increase in the handheld terminal according to a distance increase between the base station and the handheld terminal when an output increase unit of the handheld terminal is a 1 dB step.

15. The method of claim 1, wherein a gain of a handheld terminal amplifier is increased or decreased periodically according to a temporal variation.

16. A method for controlling an output power of a plurality of handheld terminals in a mobile communication system, comprising:

generating a TPC (Transmit Power Control) coding value according to transmit output characteristics of each handheld terminal;

setting an uplink Eb/No reference value with respect to each handheld terminal and comparing the Eb/No reference value with the respective TPC coding value;

selecting an optimum power control command value and transmitting the selected power control command value to the handheld terminal; and adjusting a transmit power level of the handheld terminal based on the TPC coding value and the selected power control command value, wherein the optimum power control command is selected by determining whether a transmit power level of a handheld terminal is higher or lower than a reference level set in a base station when a distance between the base station and the handheld terminal is too far or too close, wherein amplification rate allocation to the mixer unit and the PA unit is increased by applying one of four cases when there is +3 dB of output increase in the handheld terminal according to distance increase between the base station and the handheld terminal when an output increase unit of the handheld terminal is a 1 dB step, and wherein the four cases include a 3 dB of output increase in the PA unit and 0 dB of output increase in the mixer unit, 2 dB of output increase in the PA unit and 1 dB of output increase in the mixer unit, 1 dB of output increase in the PA unit and 2 dB of output increase in the mixer unit, and 0 dB of output increase in the PA unit and 3 dB of output increase in the mixer unit.

17. A system for controlling an output power of a plurality of handheld terminals in a mobile communication system, comprising:

control means for generating a TPC (Transmit Power Control) coding value according to transmit output characteristics of each handheld terminal;

setting means for setting an uplink Eb/No reference value with respect to each handheld terminal and comparing the Eb/No reference value with the respective TPC coding value;

selecting means for selecting an optimum power control command value and transmitting the selected power control command value to the handheld terminal; and adjusting means for adjusting a transmit power level of the handheld terminal based on the TPC coding value and the selected power control command value, wherein the setting means and the selecting means are located in a base station, and wherein the handheld terminal controls the output power by controlling an amplification rate of a PA (Power Amplifier) unit and an amplification rate of a mixer unit in order to generate various transmit output characteristics based on the TPC coding value and the optimum power control command sent from the setting means of the base station such that the base station selectively controls the amplification rates of the PA unit and the mixer unit and wherein the TPC coding value and the selected power control command value sent from the base station include at least four states including 1) an increase in the amplification rate of the PA unit, 2) an increase in the amplification rate of the mixer unit, 3) a decrease in the amplification rate of the PA unit, and 4) a decrease in the amplification rate of the mixer unit.

18. The system of claim 17, wherein the control means and the adjusting means are located in the handheld terminal.

* * * * *